METHOD AND APPARATUS FOR TREATING DIGESTION TANK SUPER-NATANT LIQUOR

Filed Feb. 12, 1968 2 Sheets-Sheet 1

INVENTOR.
NYE GRANT
BY
Jerome R. Cox
ATTORNEY

INVENTOR.
NYE GRANT
BY
Jerome R. Cox
ATTORNEY 3,464,918

METHOD AND APPARATUS FOR TREATING DIGESTION TANK SUPER-NATANT LIQUOR

Nye Grant, 120 Croswell Road, Columbus, Ohio 43214

Filed Feb. 12, 1968, Ser. No. 704,654
Int. Cl. C02c *1/14, 1/02, 5/10*
U.S. Cl. 210—8 13 Claims

ABSTRACT OF THE DISCLOSURE

A waste water purification process and apparatus are disclosed showing an apparatus consisting of (1) an anaerobic bacterial sludge digestion tank which receives solids from settling tanks for primary, secondary, and/or tertiary waste water treatments, the products of the digestion tank being gas, digested sludge and supernatant liquor, (2) an aeration tank for stabilizing and purifying the supernatant liquor in an aerobic bacterial mixed liquor kept aerated and mixed by compressed air or mechanical aerators, (3) a recirculation system and apparatus for directly recirculating the acclimated aerobic bacterial mixed liquor floc of the supernatant aeration tank, and (4) a settling tank for the mixed liquor from the supernatant aeration tank, where solids separate from the liquid, the solids to be sent to the sludge disposal facilities and the clarified liquid to be returned to the waste water treatment facilities.

The method disclosed comprises the subjecting of the supernatant liquor formed in the anaerobic digestion step to a recycling aeration step in the presence of aerobic bacteria and the separation of the solids from the stabilized supernatant liquor in a settling tank.

Alternatively there is disclosed a plurality of settling tanks and aeration tanks where the raw sewage is treated prior to the anaerobic digestion thereof. These previously known prior treatments may vary and may include an activated sludge treatment, trickling filters, chemical precipitation and other processes.

BACKGROUND OF THE INVENTION

My invention relates to a method for the prevention of air and water pollution arising from and growing out of anaerobic liquid-solids suspensions from standard and high rate sludge digestion tanks in sewage purification systems. These suspensions are generally referred to in the art as supernatant liquor. My invention also provides the removal of a major part of the phosphorous compounds from the effluent liquid of the supernatant liquor treated in accordance with my invention. This supernatant liquor does not readily stabilize in an orderly and innocuous manner when subjected to the general methods of the prior art for the treatment of water carried industrial wastes, of domestic sewage, or a combination of industrial wastes and domestic sewage.

According to the nitrogen cycle, plant life synthesizes its constituents at least in part by its use of carbon dioxide, water, nitrates, nitrites, and other salts such as phosphates. Animals eat the plants and form more complex nitrogenous compounds such as, for example, proteins. The excreta and other waste products of animals (as well as the animals themselves when they die) are converted back by putrefaction and/or aerobic decomposition to simpler water soluble compounds such as nitrates, nitrites, etc. But the anaerobic putrefaction process in nature is slow, offensive, and inimical to life. The nature process by oxidation through exposure to air is not offensive. Bacteria, anaerobic and aerobic, usually aid in the life cycle but direct oxidation and reduction can also occur.

As stated, nature's process is slow. The modern art of sewage treatment is partly the speeding up of nature's oxidation processes and the elimination of offensive odors, products, and processes. As cities grow, there is need continuously for more speedy and efficient processes utilizing (as nature does) oxygen, and various types of anaerobic and aerobic bacteria but utilizing these more efficiently and with more speed. Workers in this art have for many years used aeration tanks in which air (necessary to the action of the aerobic bacteria) is applied gently or violently to the sewage to purify it in combination with digestion tanks in which anaerobic bacteria are allowed to work on the sewage in the absence of air. In the early part of the century workers discovered the use of a process involving activated sludge wherein sewage sludge from a later portion of the purifying process is recirculated back to an aeration tank near the beginning of the purification process so as to supply aerobic bacteria which are effective in the presence of oxygen but are killed off in the absence of oxygen. This discovery of the use of activated sludge was a great step forward, but as cities grow, more and more speed in smaller and smaller areas is required.

In the treatment of sewage, various combinations of settling tanks, aeration tanks and digestors have been proposed. See Schlenz et al. 2,359,004; Walker 2,394,413; Hays 2,458,163; Thompson et al. 2,798,041; Torpey 2,850,449; Murray 3,186,939; and Albertson 3,226,317. In many of these patents, processes are disclosed by which sewage sludge (which has been treated and thus has developed bacteria) is returned to be mixed with incoming raw sewage and there aerated so that aerobic bacteria digest the mixture. See Walker, Torpey, Murray and Albertson. Although these inventors may have recognized that the supernatant liquor from the digestors causes a problem, there is no indication except in the patent to Schlenz et al. that they did. Where the others mention the supernatant liquor at all, as in Torpey, Murray and Albertson, the supernatant liquor from the digestors or digestion tanks is returned to the raw sewage flow. I have found that this causes great difficulties. I therefore tried the use of aeration on the supernatant liquor as did Schlenz et al. in his Patent 2,359,004. By itself, as disclosed in said Schlenz patent, aeration was simply insufficient and malodorous in the initial application of air. I provided recirculation of a portion of the liquor in the supernatant aeration tank in order to build up an aerobic floc therein and to provide an activated floc reaction, and found a successful solution to the problem. I have discovered that I can purify the supernatant liquor satisfactorily in a separate supernatant liquor aeration tank in the presence of air and aerobic bacteria. I pump air into the bottom of this tank releasing it into the supernatant liquor at a multitude of points near the bottom of the tank where it bubbles up through the liquor and at the same time I recirculate liquor containing activated bacterial floc through the aeration tank. Mechanical aeration equipment would also furnish air for this process, but compressed air is more easily varied in application.

The method of stabilizing supernatant liquor with my invention of Activated-Oxidation is by enveloping the anaerobic supernatant liquor with a liquid suspension of an aerobic floc mixed liquor that has been acclimatized and contains a bacterial culture developed by selective survival of the most viable and resistant bacteria which can use the unstable organic compounds of the supernatant liquor as a substrate.

The supernatant liquors from digestion tanks have heretofore been:

(1) Discharged into lagoons, or (2) Returned to the liquid phase of the treatment processes for the waste waters or sewages generally consisting of preliminary treatment by removal of coarse solids, primary treatment by partial removal of suspended solids, secondary treatment by partial biological stabilization and partial removal of dissolved and suspended solids, or (3) Simple aeration by compressed air or mechanical aeration, or (4) Chlorination.

The objective of the discharge of the supernatant liquor from digestion tanks to lagoons or to the liquid phase of the waste water or sewage treatment processes was to dispose of a malodorous liquid-solids suspension, having a high-bio-chemical oxygen demand, from the sludge digestion system to provide volume for incoming flows of sludges from the settling tanks of the liquid phase of the waste water or sewage treatment processes.

The prior art method of disposal of supernatant liquors into lagoons has resulted in air pollution due to the escape of obnoxious gases from the liquid and solids in the lagoon. The prior art method of discharge of supernatant liquor to the liquid phase treatment processes has resulted in reducing the efficiency of those processes down to the extent of complete failure of the orderly aerobic biological transformation of unstable organic wastes into stable organic and inorganic compounds. The prior art method of simple aeration of supernatant liquor has resulted, during the initial stages of aeration, in the emission and driving-off of air polluting gases from the liquor such as hydrogen sulphide, indol, skatol and mercaptan, and volatile acids such as acrylic, butyric, valeric, caprioc and caprylic, sometimes referred to as the goat acids. These polluting gases are malodorous and offensive to people within a radius of many miles and are probably dangerous to the health of these people.

There is therefore a need for an efficient method of and means for purifying the anaerobic liquid-solids suspensions from sewage sludge digestion tanks ("supernatant liquor") prior to (1) its discharge into lagoons, (2) its return to the liquid phase of the sewage treatment processes, or (3) its dispersion otherwise.

OBJECTS

It is therefore an object of my invention to provide improved methods for the treatment of sewage.

It is a further object of my invention to provide improved apparatus for the treatment of sewage.

It is a further object of my invention to prevent the pollution of water and air by the products of sewage treatment plants.

It is a further object of my invention to insure an effluent from a sewage treatment plant which has a lower B.O.D., and is less malodorous and objectionable to the people of our country.

It is a further object of my invention to remove from sewage effluent a major part of the insoluble phosphorous compounds.

Further objects and features of my invention will be apparent from the following specification and claims when considered in connection with the accompanying drawings illustrating several embodiments of my invention.

SUMMARY OF THE INVENTION

I have found that these and other objects may be attained by methods and apparatus wherein the supernatant liquor from the anaerobic digestion tanks of a sewage treatment plant is delivered from the digestion tanks to activated liquor aeration tanks; and wherein the supernatant liquor is distributed to a plurality of separated points in said aeration tanks, air under pressure is delivered to a plurality of points in the bottom of said tank (or air may be alternatively supplied by mechanical aerators), and activated aerobic bacterial floc is recirculated through said tank to increase the action of oxygen in the air and said bacterial floc on the liquor. After treatment in the aeration tank, the liquor together with waste floc is delivered to a settling tank where the top effluent is directed to a waste water treatment section or to the incoming sewage or to lagoons or elsewhere. The sludge is directed to a sludge disposal operation.

Figure 1:
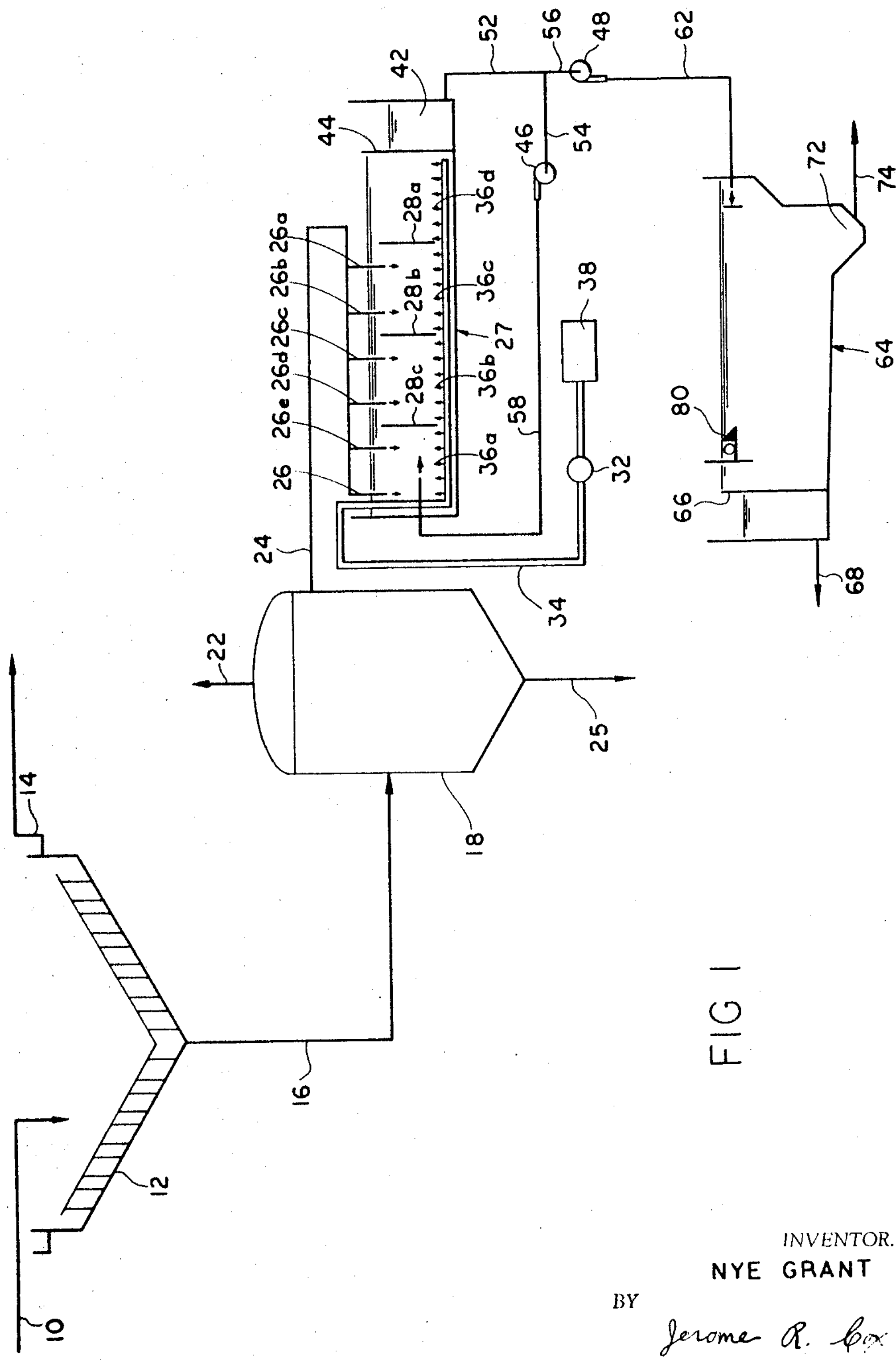
FIGURE 1 is a largely diagrammatic view showing broadly a sewage purification system in which raw sewage is directed to a settling tank and then the sludge thereof is directed to a digestion tank, and where the supernatant liquor from the digestion tank is directed to my supernatant liquor activated bacterial floc aeration tank and thence to a settling tank for separation of the sludge from the purified liquor.

In describing the preferred embodiments of the invention, illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DESCRIPTION OF THE PREFERRED EMBODIMENTS

Structure

A sewage treatment system is disclosed in FIGURE 1. Therein is shown a settling tank 12 into which sewage either raw or preliminarily treated is fed by line 10. An effluent line 14 and a solids outlet line 16 are also provided, leading from the tank 12. From the tank 12, the solids (sludge) flow through line 16 to the digestion tank 18 where the sludge is treated by anaerobic bacteria and is broken down into gas evolving through outlet 22, the supernatant liquor flowing out through line 24 and the sludge or solids moving out through outlet 25.

The supernatant liquor flows from line 24 through a series of distributors such as 26, 26*a*, 26*b*, 26*c*, 26*d*, and 26*e* into the activated supernatant liquor aeration tank 27. Because of the number of each distributors, the liquor is well distributed through the tank so that there is no excess concentration of raw liquor in the aeration tank. A series of baffles such as 28*a*, 28*b*, and 28*c* divides the aeration tank into sections and also aids in the distribution of the incoming supernatant liquor.

Air is pumped into the aeration tank to aid in the aerobic bacterial action. An air blower 32 in air line 34 forces air out through a multitude of orifices such as 36*a*, 36*b*, 36*c*, and 36*d* positioned in the bottom of the tank so that the air will bubble up through the liquor in the tank. The pump 32 may be regulated as desired in order to provide air at the desired rate so that the bubbling may be gentle or agitated as desired. An air cleaner 38 for cleaning air entering the pump 32 may be provided.

Provision is made for means to supply, and keep supplying, activated aerobic bacterial floc to the aeration tank. To this end, the activated floc is recirculated through the tank. The floc collects in a well 42 passing over a weir 44 and is drawn from the well 42 by pumps 46 and 48 through lines 52, 54, and 56. The floc drawn through lines 52 and 54 into pump 46 is forced out through line 58 and returned to tank 27 at the opposite side of the tank from the well 42 so that it circulates through the liquor for the full length of the tank.

The stabilized liquor and waste floc are drawn by pump 48 through lines 52 and 56 and forced through line 62 into settling tank 64 where the effluent passes over weir 66 and out through effluent line 68 to waste water treatment section, or if desired, back to the system by way of a line, such as for example, by way of line 10 with the incoming raw sewage. The sludge collects in sludge hopper 72 and then passes out through line 74 to the sludge disposal section. Floating solids are removed by skimming equipment 80 and sent with the sludge to the disposal section.

Figure 2:
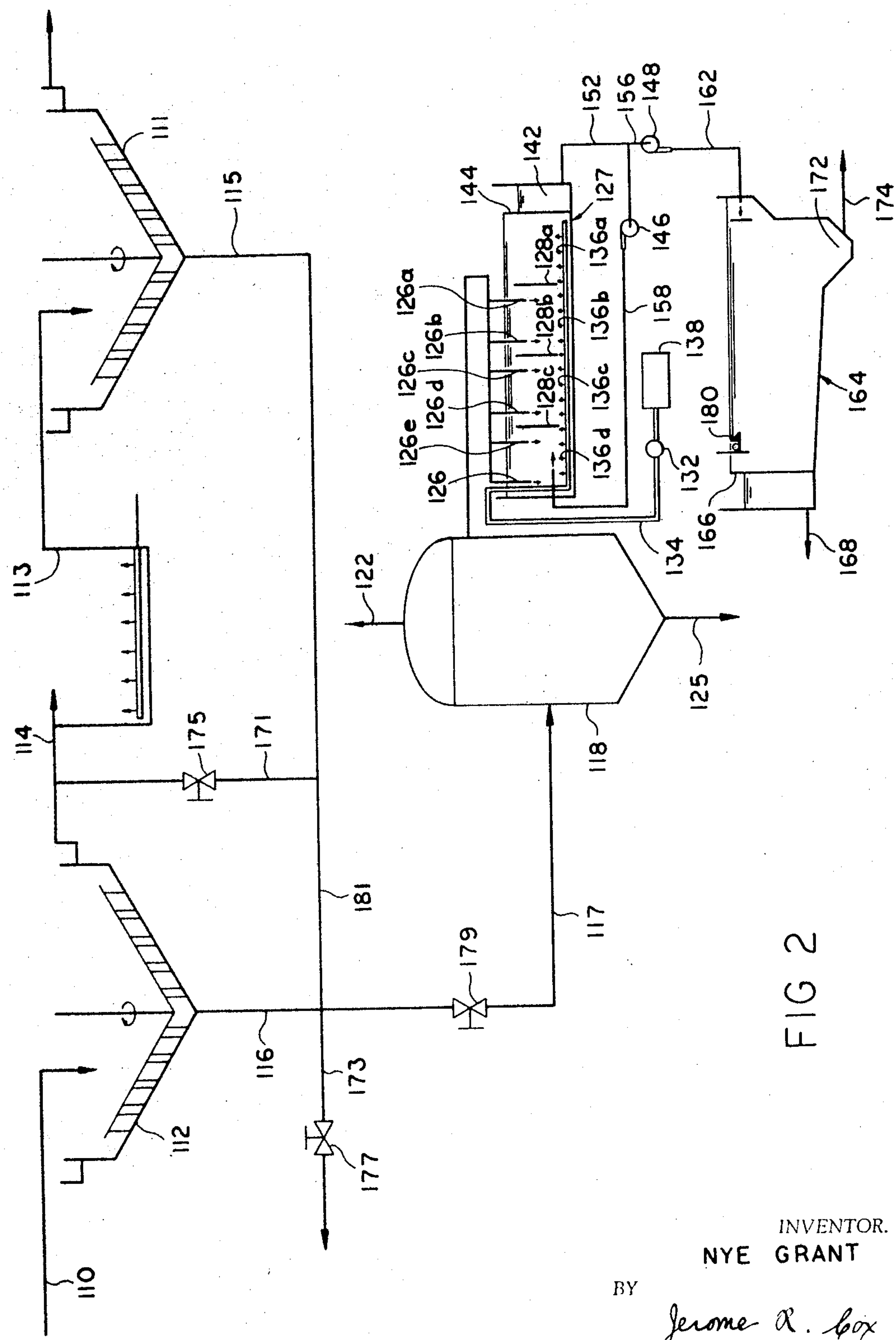
FIGURE 2 is a view similar to FIGURE 1 but showing more conventionally a plurality of settling tanks and an aeration tank by all of which the raw sewage is treated prior to its introduction into the digestion tank.

In FIGURE 2, there are shown the same components as are shown in FIGURE 1. These are designated by the same numerals as in FIGURE 1 with the addition of 100.

Also, there is shown in FIGURE 2 another settling tank 111, and activated sludge aeration tank 113. There may be provided other secondary treatment such as by trickling filters, etc. Therein there are provided two stages of treatment such as primary treatment and secondary treatment as is usual. A sludge line 115 allows the flow of solids from settling tank 111 to a junction with line 116. Intermediate the line 115 as at 181, there may be, and preferably is, concentration in a flotation tank or a centrifuge. From line 116, the combined sludge output from primary and secondary tanks 111 and 112 may flow into digestion tank 118 through line 117. Lines 171 and 173 having valves 175 and 177 respectively may be provided if desired. By means of line 171 and valve 175, as much as desired of the sludge output of settling tank 111 may be returned to aeration tank 113 to initiate, continue, and control the activated sludge process in aeration tank 113. By the use of line 173 and valve 177, as much as desired of the sludge from the system may be discharged from the system. A valve 179 may be inserted in line 117 if desired. Various arrangements of settling tanks, aeration tanks, pumps, valves, screens, grit removers, etc. may be used in any order of operation, as is well known in the art, in the operation of the system to treat the sewage prior to its delivery to the digestion tank or tanks inasmuch as my invention relates to the treatment of the supernatant liquor which is delivered from the digestion tank and the disposal of such supernatant liquor.

OPERATION

The operation of the system is fairly obvious. Incoming raw sewage flows in at 10 and is separated into effluent passing out of the system at 14, and solids or sludge passing out through line 16 to digestion tank 18. There the sludge is separated into gas evolving through 22, solids leaving through line 25 and supernatant liquor flowing out through 24. The supernatant liquor is delivered at distributed points through distributors such as 26, **26*a*, 26*b*, 26*c*, 26*d* and 26*e* into supernatant liquor activated aeration tank 27. Air is circulated through this tank continuously from pump 32 through conduit 34 and bubblers such as 36*a*, 36*b*, 36*c*, and 36*d*. Alternatively, mechanical aerators may be used. Activated floc is recirculated through lines 52, 54, and 58 by pump 46. Overflow stabilized liquor and floc is pumped through lines 52, 56, and 62 by pump 48 to settling tank 64. The amount of the floc and liquor recirculated and the amount passed to settling tank 64 is controlled by the operation of pumps 46 and 48. This may be automatically controlled by the height of liquor in the tank 27, if desired. From the tank 64, solids are sent to sludge disposal section through line 74, and the effluent is sent to waste water treatment section (or elsewhere as desired) through line 68**.

In FIGURE 2, the operation is substantially the same. However, to illustrate that various other treatments may be used prior to transmission of the treated sewage to the diegstion tank, I have shown the incoming raw sewage coming into the system at 110 being separated in the primary settling tank 112 into sludge flowing through lines 116 and 117 to digestion tank 118, and have shown the effluent flowing through line 114 to activated sludge aeration tank 113 from which it flows to secondary settling tank 111. Sludge from settling tank 111 flows normally through lines 115 and 117 to disgestion tank 118 with a portion thereof being diverted through line 171 to aeration tank 113 in order to seed the activated sludge process. The amount so diverted is controlled by valve 175.

It is to be understood that while the detailed drawings and specific examples given described preferred embodiments of the invention, they are for the purpose of illustration only; that the apparatus of the invention is not limited to the precise details and conditions disclosed; and that various changes may be made therein without departing from the spirit of the invention which is defined by the following claims.

I claim:

1. In a method for the treatment and purifying of sewage and the like, which comprises allowing sewage to settle into layers of sludge and effluent, removing the sludge and effluent separately, digesting the sludge, and withdrawing supernatant liquor from said digestion step the improvement which comprises activating said supernatant liquor by introducing increments of air at a plurality of points into said withdrawn supernatant liquor in the presence of aerobic bacteria, developing an aerobic floc therein, and recirculating at least a portion of such aerobic floc by withdrawing increments of aerobic floc from an outlet at one portion of said withdrawn supernatant liquor and forcing said withdrawn aerobic floc directly back into said withdrawn supernatant liquor at a point distant from said outlet.

2. The method of claim 1, wherein the sludge is treated in the digestion step with anaerobic bacteria.

3. The method of claim 1, in which an activated bacterial floc is developed by introduction of air to the supernatant liquor in the presence of aerobic bacteria, in which a part of the activated floc is recirculated from the outlet of said supernatant liquor activating step back to the supernatant liquor activating step and in which a part of the activated floc is delivered from said outlet to a final settling step.

4. The method of claim 1, in which supernatant liquor is distributed to said supernatant liquor activating step at a plurality of separated points.

5. The method of claim 1, in which the liquid suspension of aerobic floc mixed liquor so recirculated envelops the anaerobic supernatant liquor withdrawn from the digestion step.

6. In an apparatus for the treatment and purifying of sewage and the like, which comprises means for digesting sludge obtained from raw sewage, and means for withdrawing supernatant liquor from said digesting means;

the improvement which comprises, in combination therewith, a supernatant liquor aeration tank to which supernatant liquor is delivered from said digesting means; and which is provided with an outlet; means including a pipe for recirculating aerobic floc from said outlet, through said pipe and directly back to and through said supernatant liquor aeration tank; and a supernatant liquor settling tank to which at least a part of the aerated supernatant liquor is delivered from said supernatant liquor aeration tank.

7. The apparatus of claim 6, in which the supernatant aeration tank is provided with a plurality of baffles.

8. The apparatus of claim 6, in which the supernatant aeration tank is provided with a plurality of baffles, in which the supernatant liquor flows into said supernatant aeration tank through a plurality of inlet conduits each provided with an outlet into said aeration tank, and in which the supernatant liquor is passed through the aeration tank from the outlets of the inlet conduits to the outlet of the aeration tank, said baffles separating the outlets of some of said conduits from the outlets of others of said conduits.

9. The apparatus of claim 6, in which the means provided for recirculating said aerobic floc from said outlet through said pipe and back of and through said supernatant liquor aeration tank comprises a pump for forcing floc from said outlet back to said supernatant aeration tank at a point remote from said outlet.

10. The structure of claim 6, in which the means for digesting the sludge is a digestion tank.

11. The structure of claim 10, in which there is provided, in addition, means for mixing raw sewage with activated sludge, an aeration tank receiving the mixture from said mixing means, and a settling tank into which the mixture is introduced from said aeration tank and from which sludge is introduced into said digestion tank.

12. The structure of claim 11, in which there is provided in combination with said supernatant liquor settling tank, means for removing sludge and liquid separately from said supernatant liquor tank.

13. In an apparatus for the treatment and purifying of sewage and the like, which comprises means for digesting sludge obtained from raw sewage, and means for withdrawing supernatant liquor from said digesting means;

the improvement which comprises, in combination therewith, a supernatant liquor aeration tank to which supernatant liquor is delivered from said digesting means; means for recirculating aerobic floc through said supernatant liquor aeration tank; and a supernatant liquor settling tank to which at least a part of the aerated supernatant liquor is delivered from said supernatant liquor aeration tank, in which at least one outlet from said supernatant aeration tank is provided; an outlet pump is provided for pumping material from said supernatant liquor aeration tank to said supernatant settling tank; and a recirculating pump is provided for recirculating activated bacterial floc from one of said outlets back to said supernatant liquor aeration tank.

References Cited

UNITED STATES PATENTS

| | | | |
|---|---|---|---|
| 2,359,004 | 9/1944 | Schlenz et al. | 210—8 X |
| 3,220,945 | 11/1945 | Torpey | 210—5 |
| 3,236,766 | 2/1966 | Levin | 210—18 X |

OTHER REFERENCES

Imhoff, K., et al., Sewage Treatment, 2nd edition, 1956, John Wiley & Sons, Inc., New York, pp. 154–155.

MICHAEL E. ROGERS, Primary Examiner

U.S. Cl. X.R.

210—196, 221

UNITED STATES PATENT OFFICE

CERTIFICATE OF CORRECTION

Patent No. 3,464,918 September 2, 1969

Nye Grant

It is certified that error appears in the above identified patent and that said Letters Patent are hereby corrected as shown below:

Column 5, line 67, "diegstion" should read -- digestion --. Column 7, lines 5 and 6, "back of and through" should read -- back to and through --.

Signed and sealed this 10th day of February 1970.

(SEAL)
Attest:

Edward M. Fletcher, Jr.
Attesting Officer

WILLIAM E. SCHUYLER, JR.
Commissioner of Patents